United States Patent [19]

Doner

[11] Patent Number: 5,835,859
[45] Date of Patent: Nov. 10, 1998

[54] METHOD FOR FREQUENCY ALLOCATION AND ASSIGNMENT IN WIRELESS COMMUNICATION SYSTEMS

[75] Inventor: John R. Doner, Sebastian, Fla.

[73] Assignee: AirNet Communications Corporation, Melbourne, Fla.

[21] Appl. No.: 542,720

[22] Filed: Oct. 13, 1995

[51] Int. Cl.[6] .................................................. H04Q 7/36
[52] U.S. Cl. ........................... 455/447; 455/450; 455/62
[58] Field of Search .................................. 455/33.3, 33.1, 455/56.1, 62, 63, 54.1, 34.1, 447, 450; 379/59

[56] References Cited

U.S. PATENT DOCUMENTS

| 4,144,496 | 3/1979 | Cunninggham et al. | 455/33.3 |
| 4,485,486 | 11/1984 | Webb et al. | 455/33.3 |
| 4,726,050 | 2/1988 | Menich et al. | 455/33.3 |
| 5,073,971 | 12/1991 | Schaeffer | 455/33.1 |
| 5,212,830 | 5/1993 | Miller | 455/33.1 |
| 5,257,398 | 10/1993 | Schaeffer . | |
| 5,319,796 | 6/1994 | Grube et al. | 455/33.4 |
| 5,483,667 | 1/1996 | Faruque | 455/33.1 |

FOREIGN PATENT DOCUMENTS

0616481A2  9/1994  European Pat. Off. .

OTHER PUBLICATIONS

Mangini, D.M., "Frequency Coordination of Cellular System" 37th IEEE Vehicular Technology Conference: Quality Requires Work, pp. 312–317, Jun. 1–3, 1987.

Faruque, S., "The N=9 Frequency Plan: A Modified Technique to Enhance C/I Performance and Capacity", International Conference on Universal Personal Communications, pp. 718–722 vol. 2, Oct. 12, 1993.

*Primary Examiner*—Andrew Faile
*Assistant Examiner*—Vincent F. Boccio
*Attorney, Agent, or Firm*—Farkas & Manelli PLLC

[57] ABSTRACT

A single-cell wireless communication system is partitioned into n sectors, to which channels are allocated from two groups of non-adjacent channels. If the available channels are consecutively numbered from lowest to highest frequency, or vice versa, the groups are, respectively, the even-numbered channels and the odd-numbered channels. These two groups are each subdivided into n/2 sets, with the first set of each group including the lowest numbered channels of the group, the next set including the next lowest-numbered channels of the group, and so forth. The sets are then allocated to the sectors such that the first set of one of the groups is allocated to a first sector, the next set of the same group is allocated to a contiguous sector and so forth, with the last set of the second group allocated to the nth sector. The dividing points between the sets are selected such that any sector has at most a single channel that may experience adjacent-channel interference from a channel that is allocated from a contiguous sector. Preferably, a channel is selected for assignment to the mobile units such that the selected channel is within a greatest gap between the channels of the same set that are then in use. If the selected channel is the one channel that may experience adjacent-channel interference, another channel may be selected from the set.

2 Claims, 4 Drawing Sheets 5,835,859

METHOD FOR FREQUENCY ALLOCATION AND ASSIGNMENT IN WIRELESS COMMUNICATION SYSTEMS

FIELD OF THE INVENTION

This invention relates generally to wireless radio frequency communication systems and in particular to a technique for assigning frequencies to mobile units.

BACKGROUND OF THE INVENTION

The ever-increasing demand for wireless communication services, such as cellular mobile telephone, digital cellular network, personal communications services and the like, requires the operators of such systems to attempt to make maximum effective use of available radio frequency bandwidth. A system operator is typically allocated a geographic territory, and a certain amount of bandwidth that affords the ability to transmit and receive on a particular number of different channel frequencies (referred to hereinafter as "channels") within that territory. In an effort to make the best use of the available frequency space, a large geographic territory is typically divided into a number of sub-areas called cells. Each cell includes an associated base station and an antenna that together handle communications with mobile units within the cell. Each area covered by an antenna, and thus, each cell, is considered a single coverage area.

Once the geographic territory is divided into cells, the system operator allocates the available channels among the cells, or coverage areas, so as to minimize adjacent-channel interference and, also, to minimize co-channel interference. To do this, the operator typically allocates non-adjacent channels to a single coverage area. If, for example, the available channels are consecutively numbered from lower frequencies to higher frequencies, or vice versa, a cell is allocated every other channel, i.e. the odd-numbered or the even-numbered channels. Under this scheme, a geographic territory serviced by a single cell is allocated a set of non-adjacent channels, which is one-half of the spectral allocation. Accordingly, only one-half of the channels available to the system operator are made available to the mobile units.

To further increase channel availability, the cell may be subdivided into a number of sectors, with each sector serviced by an associated directional antenna. Each sector is thus considered a single service area, which means that each sector has allocated to it a subset of the available channels. Accordingly, in a cell that has three sectors, the first sector may be allocated channels 1, 4, 7 and so forth; a second sector allocated channels 2, 5, 8 and so forth; and a third sector allocated channels 3, 6, 9 and so forth. Thus each sector is allocated a group of channels modulo "n", where n is the number of sectors. This ensures that each sector is allocated a set of non-adjacent channels.

A problem with adjacent-channel interference arises at the sector boundaries, however. Each antenna provides strong signals throughout the entire associated sector, and thus, at the boundaries between, for example, the first and second sectors, communications on adjacent channels 1 and 2, 4 and 5 and so forth may interfere. Similarly, at the boundary between the first and third sectors, communications on adjacent channels 4 and 3, 7 and 6, and so forth may interfere. This scheme results in a large portion of the cell being subject to strong adjacent-channel interferences.

SUMMARY OF THE INVENTION

The invention is a single-cell wireless communication system that utilizes all of the spectral allocation available to the system operator by allocating channels to cell sectors from two subdivided groups of non-adjacent channels. The minimum number of sectors is four.

More specifically, the channels in the spectral allocation are consecutively numbered, from lower to higher frequencies, or vice versa, and divided into two groups of non-adjacent, namely, the odd-numbered channels, $S_O$ and the even-numbered channels $S_E$. If there are four sectors, the $S_O$ group of channels is further subdivided into 4/2, or two sets, $S_{OL}$ and $S_{OH}$, which contain, respectively, the lower half and the upper half of the odd-numbered channels. The $S_E$ group of channels are similarly subdivided into two sets, $S_{EL}$ and $S_{EH}$, which contain, respectively, the lower half and the upper half of the even-numbered channels. The four subsets of channels are then allocated to the four sectors so as to minimize the assignment of adjacent channels to contiguous sectors. For example, if the sectors are numbered clockwise from 1 to 4, and sector one is allocated the $S_{EL}$ set of channels, sector two is allocated the $S_{EH}$ set of channels, sector three is allocated the $S_{OL}$ set of channels and sector four is allocated the $S_{OH}$ set of channels. As discussed in more detail below, the dividing points between the sets are chosen such that there is at most one channel in any sector that may experience adjacent-channel interference at a sector boundary.

For a cell with more than four sectors, the two groups $S_E$ and $S_O$ are each divided into n/2 sets of lowest to highest-numbered channels, where "n" is the number of sectors. The sets are then allocated to the sectors by allocating to the first set of one of the groups to the first sector, the second set of the same group to the second sector, and so forth, with the last set of the second group allocated to the nth sector.

In a preferred embodiment of the invention, channels within a sector are assigned to mobile units in accordance with a technique that I refer to as the "greatest gap" technique. Using this technique, the base station determines which of the allocated channels are currently unused, or free. It then determines which of these free channels are included in the largest group of "contiguous," that is, contiguous within the set, channels. In the $S_{EL}$ set, for example, if channels 6, 8, 10, 16, 18 and 24 are currently free, the largest group of contiguous unused channels consists of channels 6, 8 and 10. This contiguous group may be thought of as a "gap" between channels that are currently in use. In the example, the greatest gap is between channels 4 and 12. Other gaps in the set consist of channels 2 and 4, and channels 16 and 18. The base station then selects for assignment to the mobile unit the channel that is in the middle of the greatest gap.

If the selected channel is one that could result in adjacent-channel interference at one of the sector boundaries, the base station may first determine if the adjacent channel in the contiguous sector is in use. If that channel is in use, the base station then selects another channel to assign to the mobile unit. The base station may select this channel from the greatest gap or from another gap, as appropriate.

Alternatively, the base station may select another channel for assignment to the mobile unit regardless of whether or not the adjacent channel is in use in the contiguous sector.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
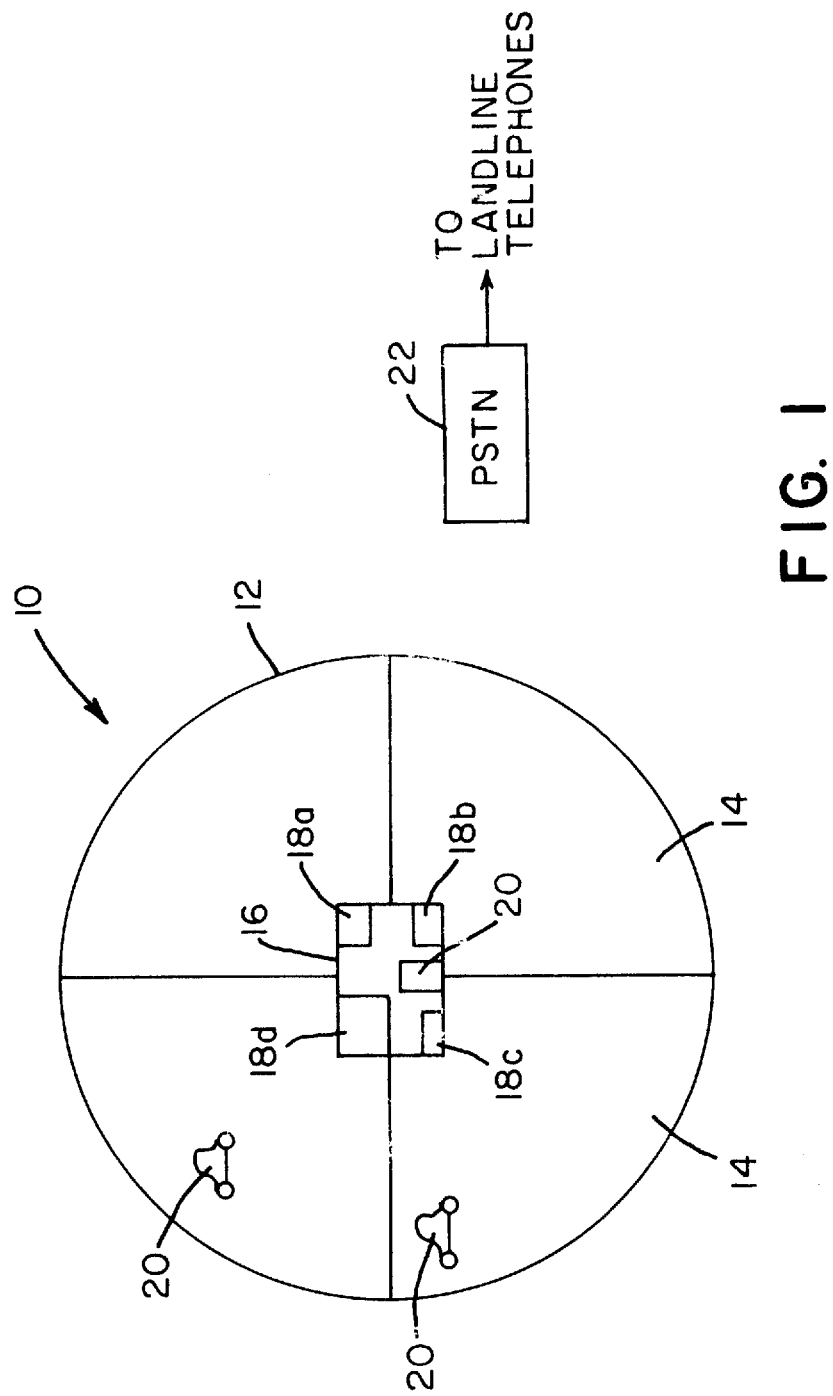
FIG. 1 is a block diagram of a wireless communication system according to the invention.

Referring now to FIG. 1, a cellular communication system 10 consists of a single cell 12 that is partitioned into a minimum of n=4 sectors 14. Such an arrangement is suitable, for example, for a system that services an island or other isolated area.

As depicted in the drawing, the cell 12 is partitioned into four ninety-degree sectors 14. The cell 12 includes a centrally-located base station 16 that has a plurality of directional antennas 18a–d, which are arranged such that each antenna 18 services an associated sector 14.

A mobile telephone exchange 20, which operates in a conventional manner, provides connections between the base station 16 and a public switched telephone network (PSTN) 22. The system thus allows mobile units 20 within the cell 12 to communicate with each other or with other devices that may be connected to the PSTN 22. To simplify the drawing connections between the mobile telephone exchange 20 and the PSTN 22 are not shown.

Figure 2:
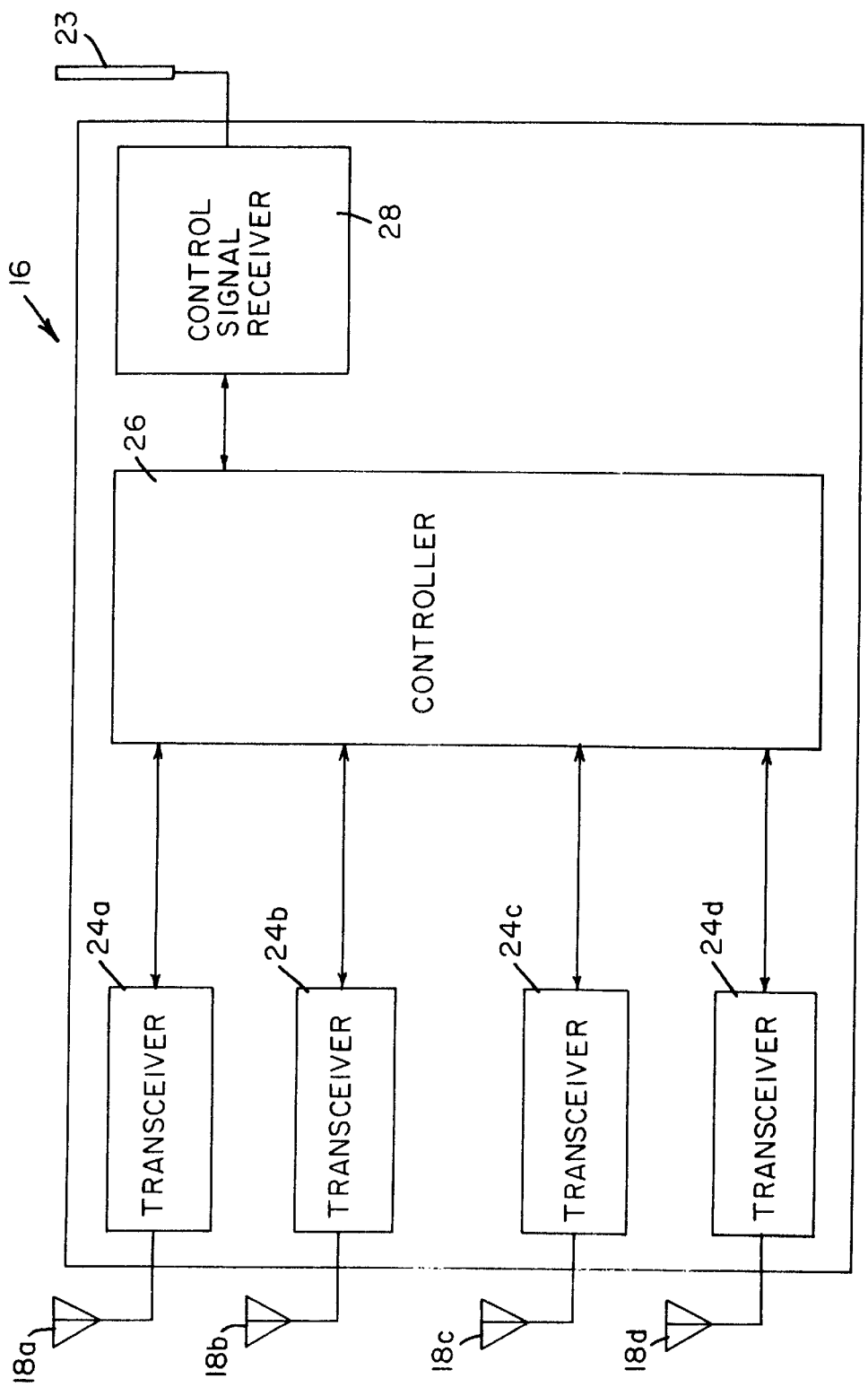
FIG. 2 is a block diagram of a base station included in the system of FIG. 1.

Referring also to FIG. 2, the base station 16 is depicted in more detail. The four directional antennas 18a–d, which each, respectively, handle communications between mobile units within their associated sectors 14, are connected to corresponding multichannel transceivers 24a–d. The transceivers 24a–d operate in a conventional manner in conjunction with a base station controller 26, to provide filtering, modulation and demodulation functions that are necessary to couple radio signals received from the mobile units 20 to the PSTN 22, and conversely, to forward signals from the PSTN 22 to the mobile units 20.

An optional omni-directional antenna 23 may be connected to a control-signal receiver 28, to permit the transmission and reception of control signals between the base station controller 26 and the mobile units 20 that are located anywhere within the cell 12. In response to the receipt of control signals that request a channel assignment, the control-signal receiver 28 determines in which sector 14 the requesting mobile unit 20 is located, and assigns to the unit a channel that is allocated to that sector. The receiver 28 then arranges for the appropriate transceiver 24a–d and antenna 18a–d to handle further communications with the mobile unit. In a preferred embodiment, the control-signal receiver assigns channels to the mobile units in accordance with a "greatest gap" technique, as discussed below with reference to FIG. 4.

Figure 3:
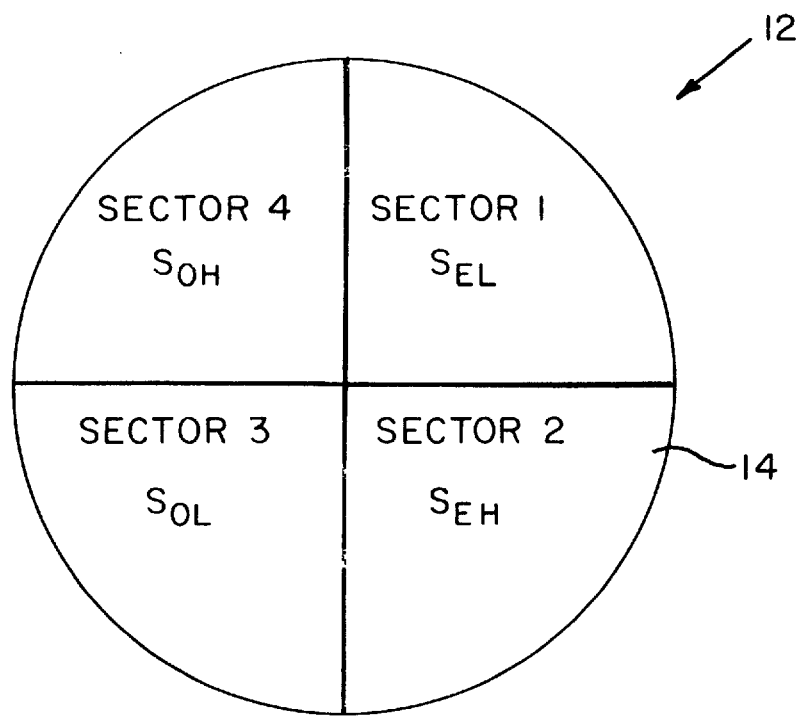
FIG. 3 is a schematic diagram of the system of FIG. 1 that depicts the channel allocation scheme that is used in the system of FIG. 1.

Referring now to FIG. 3, the channel allocations to the sectors 14 are made so as to minimize adjacent-channel interference. The channels in the spectral allocation available to the system are consecutively numbered, from the lowest frequencies to highest frequencies or vice versa. The channels are then grouped into two groups of non-adjacent channels, such as even-numbered channels, $S_E$, and odd-numbered channels, $S_O$. Next, the two groups are subdivided into n/2 sets of higher and lower frequencies. Thus, for n=4, the group of $S_E$ channels are subdivided into two sets of higher and lower frequencies, namely, $S_{EH}$ and $S_{EL}$, and the group of $S_O$ channels are also subdivided into two sets of higher and lower frequencies, namely, $S_{OH}$ and $S_{OL}$. As explained is below, the dividing points of the groups into sets are chosen and the four sets of channels are allocated to the sectors 14 such that contiguous sectors include at most one channel that may experience adjacent-channel interference.

If the sectors are numbered clockwise from 1 to 4, sector 1 is allocated the $S_{EL}$ set of channels, sector two is allocated the $S_{EH}$ set of channels, sector three is allocated the $S_{OL}$ set of channels and sector four is allocated the $S_{OH}$ set of channels. There are no adjacent channels in sectors 1 and 2, or 3 and 4, and thus, there is no adjacent-channel interference at the respective boundaries between these sectors. The dividing points between the $S_{EL}$ and $S_{EH}$ sets, and $S_{OL}$ and $S_{OH}$ sets are appropriately chosen such that there is at most a potential for adjacent-channel interference between communications over a single channel between sectors 1 and 4, or sectors 2 and 3. The sets are thus divided such that the highest-numbered channel in, for example, the $S_{EL}$ set is adjacent to the lowest-numbered channel in the $S_{OH}$ set, or the lowest-numbered channel in $S_{EH}$ set is adjacent to the highest-numbered channel in the $S_{OL}$ set. Accordingly, there is a minimum amount of adjacent-channel interference between the sectors.

If, for example, the odd-numbered channels are divided such that channel 41 is the lowest-numbered channel in sector 4, the even numbered channels should be divided such that $S_{EL}$ has channel 40 as its highest-numbered channel. Otherwise, communications on the channels of sector 1 may interfere with more than one channel in sector 4. If the dividing point between the high and low sets of the even-numbered channels was instead chosen such that the highest-numbered channel in $S_{EL}$ is channel 42, there could be interference between that channel and two channels in sector 4, namely, channels 41 and 43.

If n is odd, that is, if the cell 12 is partitioned into an odd number of sectors, the two groups of non-adjacent channels $S_O$ and $S_E$, are divided such that one group has |n/2| sets, where | | represents an integer value. The other group is then divided into |n/2|+1 sets. The first sets of each group include the lowest-numbered channels in the group, the next sets include the next lowest-numbered channels in the group and so forth, with the last sets of the groups including the highest-numbered channels. The sets are then allocated to the sectors in clockwise order, with the first set of one of the groups allocated to sector 1, the next set of the same group allocated to sector 2 and so forth, and the last set of the second group allocated to sector n. In this cell, only the sectors that have been allocated the first or last sets of a group may experience adjacent-channel interference at one of their sector boundaries.

With an odd number of sectors, differences in the number of channels that are allocated to the various sectors can be compensated for by allocating fewer channels to the sectors that cover areas with lower population densities, or by changing the sizes of the sectors that have fewer channels allocated to them.

Figure 4:
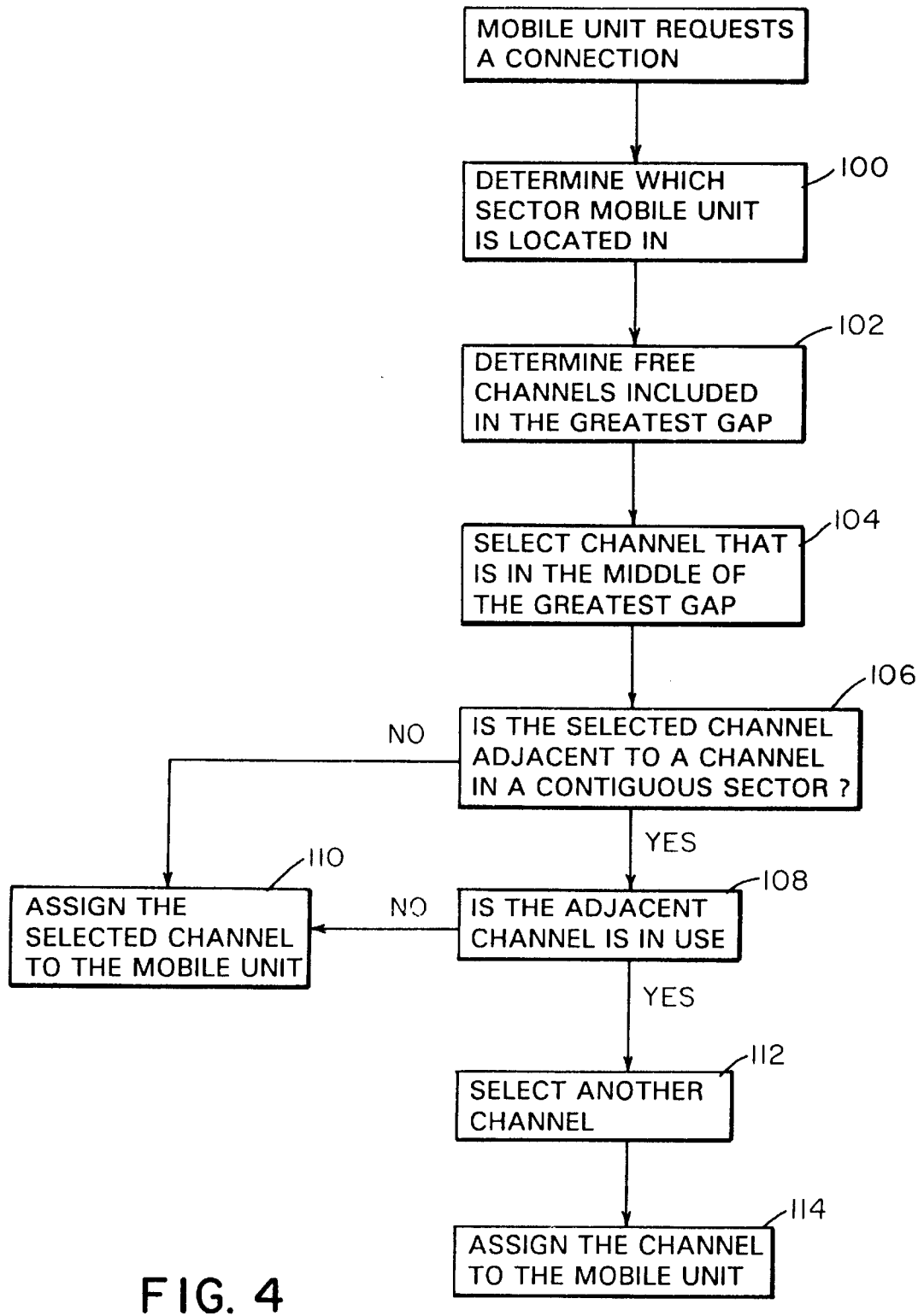
FIG. 4 is a flow chart of the operations of the base station of FIG. 2 when the system is operating in accordance with the greatest gap technique.

Referring now to FIG. 4 in conjunction with FIGS. 1 and 3, I discuss a preferred technique for assigning channels to the mobile units. When a mobile unit 20 requests a connection, the base station first determines which sector 14 the mobile unit is in (step 100). In this example, the mobile unit 20 is located in sector 1. Next, the base station 16 determines which of the channels allocated to sector 1 are not in use, and further determines which of these channels are included in the greatest "gap" between channels that are then in use (step 102). If sector 1 has allocated to it channels 2, 4, 6 . . . 40, and channels 6, 8, 10, 16, 18 and 24 are currently free, the largest group of unused channels that are contiguous within the set consists of channels 6, 8 and 10. These channels constitute the greatest gap between channels that are then in use. The base station may determine which channels are free by consulting a table (not shown) or by scanning the channels.

The base station then selects for assignment to the mobile unit the channel that is in the middle of the greatest gap (step 104). The base station thus selects channel 8. If the selected channel is the one channel that may result in adjacent-channel interference at a sector boundary, the base station determines if the adjacent channel in the contiguous sector is in use (steps 106, 108). If the adjacent channel is not in use, the base station assigns the selected channel, that is, channel 8, to the unit (step 110). Otherwise, the base station refrains from assigning the selected channel to the unit and instead assigns to the unit another of the free channels (steps 112, 114). The base station may select this channel from the greatest gap, or from any other gap. In this way, the base station avoids a potential problem with adjacent-channel interference.

Alternatively, the base station may select another channel for assignment to the mobile unit, without first determining if the adjacent channel is in use.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A method for allocating channels to sectors of a cell of a wireless communication system, the method including the steps of:

A. partitioning the cell into n sectors;

B. consecutively numbering the channels, from lowest to highest frequency, and grouping the numbered channels into a first group and a second group of non-adjacent channels;

C. subdividing each of the first and second groups into n/2 sets of channels, with a first set of each group containing the lowest-numbered channels of the associated group, the second set containing the next lowest-numbered channels of the associated group, and so forth;

D. assigning the first set of the first group of channels to a first sector of the cell;

E. assigning to a contiguous sector of the cell the second set of the first group;

F. assigning to a next contiguous sector, which is subsequent to a previously assigned contiguous sector, of the cell the next set of the first group;

G. repeating step F until all of the sets of the first group are assigned to sectors;

H. assigning the first set of the second group to a next contiguous sector; and

I. repeating step F for the sets of the second group.

2. The method of claim 1, where the cell is partitioned into four sectors, the channels are grouped into groups of even-numbered and odd-numbered channels, and the groups are subdivided into sets of even-numbered high and low channels and odd-numbered high and low channels.

* * * * *